D. P. COLLINS.
MECHANISM FOR ACTUATING CLUTCHES.
APPLICATION FILED NOV. 1, 1910.

986,363.

Patented Mar. 7, 1911.

2 SHEETS—SHEET 2.

WITNESSES
E. L. Nottingham
G. J. Downing

INVENTOR
D. P. Collins
By H. A. Seymour
Attorney

UNITED STATES PATENT OFFICE.

DENNIS P. COLLINS, OF PITTSBURG, PENNSYLVANIA, ASSIGNOR TO COLLINS AXLE MANUFACTURING COMPANY, OF PITTSBURG, PENNSYLVANIA.

MECHANISM FOR ACTUATING CLUTCHES.

986,363.  Specification of Letters Patent.  Patented Mar. 7, 1911.

Original application filed August 1, 1910, Serial No. 574,983. Divided and this application filed November 1, 1910. Serial No. 590,210.

*To all whom it may concern:*

Be it known that I, DENNIS P. COLLINS, of Pittsburg, in the county of Allegheny and State of Pennsylvania, have invented certain new and useful Improvements in Mechanism for Actuating Clutches; and I do hereby declare the following to be a full, clear, and exact description of the invention, such as will enable others skilled in the art to which it appertains to make and use the same.

My invention relates to an improvement in mechanism for actuating clutches, and is designed particularly as an improvement on the construction disclosed in my pending application No. 504,336, filed June 25th, 1909, and this application is a division of application No. 574,983, filed August 1st, 1910.

In my pending application No. 504,336 a rocking and longitudinally movable shaft, has fingers which engage and disengage clutch operating rods, and the object of the present invention is to provide means for engaging said clutch rods when the latter are disconnected from fingers on the actuating shaft, for locking said rods against accidental movement.

With these and other objects in view my invention consists in the parts and combination of parts as will be more fully described and pointed out in the claims.

Figure 1:
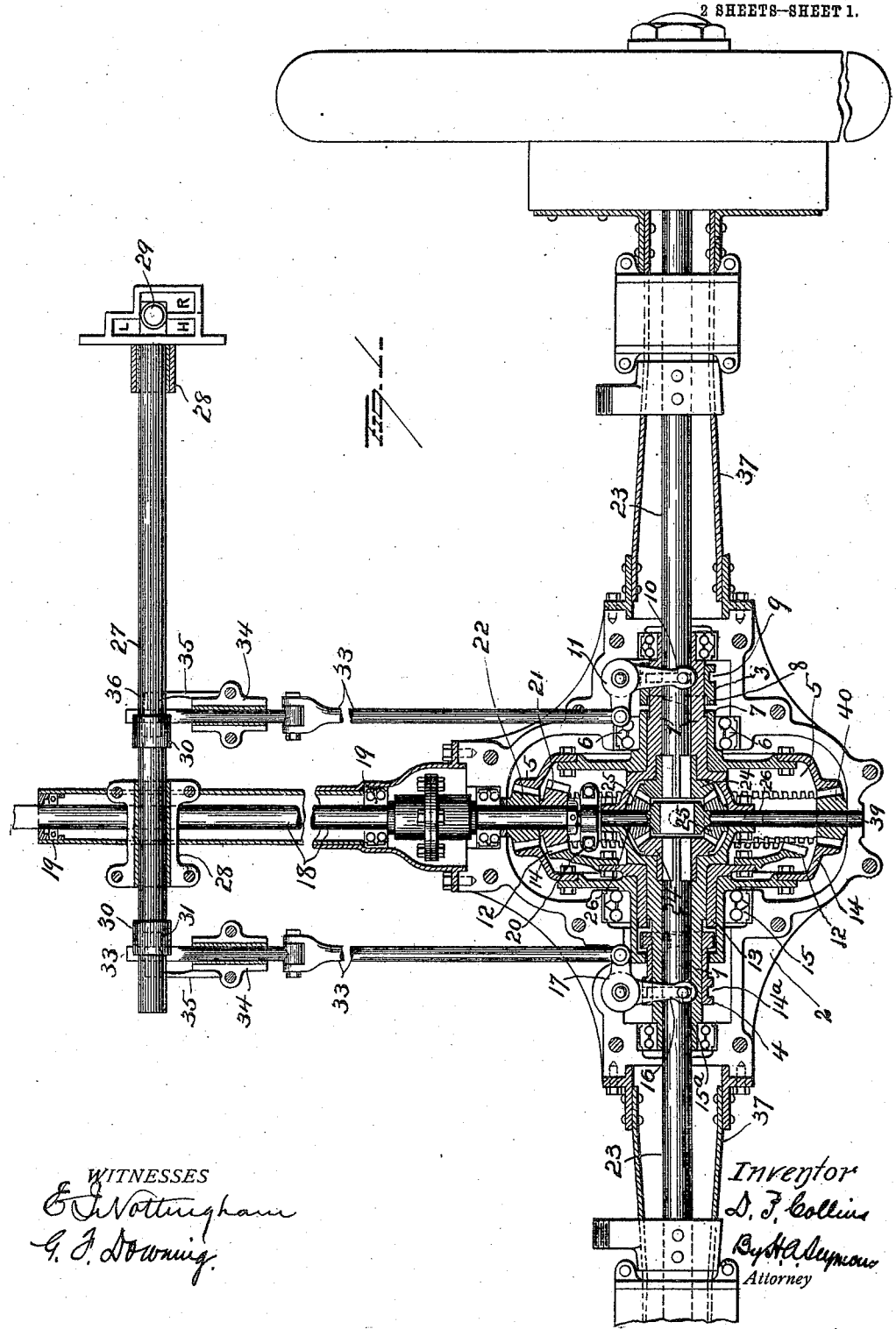
Figure 2:
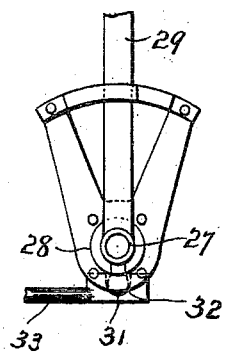
Figure 3:
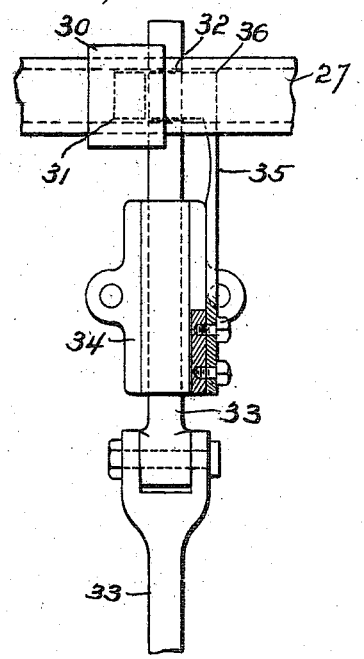
Figure 4:
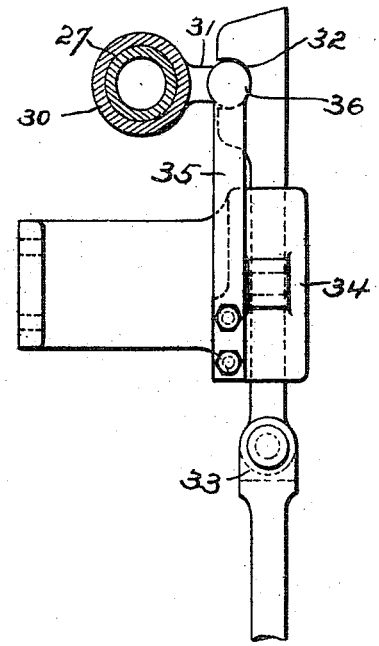

In the accompanying drawings, Figure 1 is a view partly in section and partly in elevation showing the two part axle, its sleeve transmission gearing and clutch operating mechanisms. Fig. 2 is a view in end elevation of the clutch actuating shaft, its lever and a part of one of the clutch operating rods. Fig. 3 is an enlarged view in plan of the shaft and its finger, the clutch operating rod and yielding lock for the latter, and Fig. 4 is a view in side elevation of the parts shown in Fig. 3.

1 represents the rear axle sleeve which carries the driven gears of the series, and which is mounted in the cast steel housing 2, which latter incloses said driven gears.

The portions of the sleeve embraced by the sliding clutches 3 and 4 are angular in cross section, while the remaining parts are cylindrical and form bearings for the several driven gears. Loosely mounted on a cylindrical portion of sleeve 1, is the reverse gear 5, the hub of which is mounted and supported in the roller bearing 6. The outer face or end of the hub of gear 5 is provided with clutch teeth 7, with which the teeth 8 of sliding clutch 3 mesh. This clutch has an angular bore conforming in size and shape to the angular portion of the sleeve, and is adapted to slide thereon so as to engage with or be disengaged from the clutch teeth 7 of clutch 3. In the drawing the clutch is shown disengaged, and when so disengaged, runs loosely on the sleeve when the driving shaft is rotating. The clutch 3 is provided with a peripheral groove 9, in which pins carried by the yoke 10 of the bell crank lever 11 rest. When the lever 11 is shifted by its rod to be hereinafter referred to, its clutch 3 will be shifted laterally, thus locking gear 5 to the sleeve 1, and transmitting motion from the drive shaft to the latter.

Loosely mounted on a cylindrical portion of sleeve 1, is the fast speed gear 12, and mounted on the hub 13 of the latter is the hub of slow speed gear 14. This hub of the slow speed gear is also mounted in the anti-friction bearing 15, carried by the housing 2, and is provided at its outer end with inwardly projecting clutch teeth adapted to be engaged by the teeth of clutch 4. The hub 13 of the fast speed gear is also provided at its outer end with outwardly projecting teeth adapted to be engaged by teeth on the clutch 4. The clutch sleeve projects through the outer end of the hub of the slow speed gear 14, and is provided at its outer end with a groove $14^a$ in which pins $15^a$ carried by the yoke 16 of the bell crank lever 17 rest. This clutch 4 is so constructed that the teeth thereof may rest in a neutral position between the clutch teeth of the speed gears 12 and 14, and when so placed both gears will run loosely on their respective bearings. By shifting the clutch 4 outwardly toward the slow speed gear, the latter will be locked to the sleeve and by now moving the clutch to the right, or toward the fast speed gear, the slow speed gear will be disconnected from the sleeve, and by continuing the movement of the clutch to the right, the fast speed gear will be clutched to the sleeve.

The clutches 3 and 4 are actuated by a single lever and connections to be hereinafter described, so arranged that only one clutch can be actuated at a time, hence it will be impossible to clutch up one driven gear to the sleeve while another is locked thereto.

The reverse gear 5 and the slow speed gear 14, are of the same size, and the fast speed gear is of less diameter than the slow speed and reverse gears, and is located between the latter. By this arrangement, the fast speed gear is supported by the slow speed gear, and the latter is similarly supported by the anti-friction bearing 15.

18 is the drive shaft mounted in the anti-friction bearings 19, and supported at its inner end against a thrust bearing 20 carried by the housing 2. This shaft is inclosed the greater part of its length in the fixed sleeve or housing which carries one or more of the anti-friction bearings 19, and is provided with two fixed bevel pinions 21 and 22, the former of which is larger than pinion 22, and meshes with the fast speed gear 12 while the smaller pinion 22 meshes with the reverse gear 5 and also with the slow speed gear 14. It will therefore be seen that the speed and reverse gears are directly driven, and all rotate when the driving shaft 18 is rotating.

The sleeve 1 is hollow for the passage of the sections 23 of the axle, and each axle section is provided at its inner end with a bevel pinion 24 both of which are in engagement with the bevel pinion 25 mounted on the journals 26 carried by the sleeve 1. The interior of the sleeve is enlarged in line with the driving shaft, for the reception of this differential gearing 24 and 25, and is made in two sections joined at such enlarged portion, hence when the differential gears are assembled, and the two sections of the sleeve secured together, the gears and their axles will be secured against the possibility of longitudinal displacement.

Mounted on a pintle 39 carried by the housing 2 is the idle pinion 40. This pinion may be of raw hide so as to render it practically noiseless, and it is designed to maintain the two opposing pinions, the slow speed and reverse, in positive engagement with the driving bevel gear, and thus eliminate the noise incidental to the springing apart of these gears at the pitch line when the power is applied.

The lever mechanism for actuating the clutches, consists of a single controlling lever secured to a shaft 27 mounted in bearings 28. This lever 29 passes upwardly through a selective quadrant fastened to the frame of the car, and adapted to regulate the throw and movement of the lever. By moving the lever 29 to the right or left, it will move the shaft endwise and pass from its neutral position shown in Fig. 1, into one of the longer slots of the quadrant, and will then be in a position where it can be moved rearwardly to reverse, or forwardly or rearwardly for slow or fast speed as may be desired. The shaft 27 carries two fixed collars 30 each of which is provided with a projecting finger 31 resting in line with slots 32 formed in the clutch operating rods 33. These rods are preferably made in two sections hinged together as shown in Fig. 1, the outer and shorter members of the rods being mounted in the elongated bearings 34, and provided at their outer ends with their slots 32, while the longer members are connected at their rear ends to the bell crank levers 11 and 17.

As shown in Fig. 1, the fingers 31 are in their neutral positions, or the positions they occupy when lever 29 and the clutches 3 and 4 are in their neutral positions. By now moving lever 29 to one side, say to the right, it will shift shaft to the right and bring the finger 31 controlling the movement of clutch 3, into slot 32 in rod 33. By now moving lever 27 backwardly it will partly rotate shaft 27, and shift rod or pitman 33, controlling clutch 3, forwardly, and move clutch 3 to the left and into engagement with the reverse gear 5. If the lever 29 be now pushed forwardly, and shifted to the left, it will first pass to its neutral position thus disconnecting clutch 3. By continuing the movement to the left it will enter the longer slot in the selective quadrant thus causing the other finger 31, on shaft 27, to enter its slot in the rod or pitman 33, and by now moving the lever forwardly or rearwardly, clutch 4 will be shifted to lock the slow or fast speed gears to the sleeve 1.

With the construction thus far described, there is nothing to prevent the rods 33 from moving, or being moved accidentally when out of engagement with their fingers 31 on shaft 27, and one of the principal objects of this invention is to provide means for locking said rods against movement when disconnected from shaft 27.

The means for locking the rods consists of plate springs 35, one for each rod, secured to the bearings 34 or other suitable support and each provided with a head 36 which, when the rods 33 are disengaged from the fingers 31, rests in the slots 32 in said rods and thus lock the rods against movement. The heads 36 of these plate springs rest in line with the slots 32 when the latter are in their neutral position, and when the slots are free of the fingers 31, the elasticity of the springs carries said heads 36 into the slots, thus forming positive locks for the rods 33. As the shaft 27 is moved longitudinally, say to the right in order to throw in the reverse gear, the finger 31 moves into contact with head 36 and forces it, against the tension of its spring, out of the slot 32, and as the rod 33 is moved longitudinally by the rocking movement of the shaft 27, the disengaged head simply slides against the side of its rod. To disengage the finger from the slot, the lever must be moved to its neutral position and then moved sidewise, and as it moves, the shaft 27 also moves laterally, thus carrying the finger 31 out of the slot. As the finger leaves the slot the spring of the plate forces the head into the slot and thus positively locks the rod 33 against any accidental endwise movement. Secured to the opposite ends of the casing, are the sleeves 37 carrying suitable journals for the axle sections and also brackets for the attachment of the car frame and braces, and the casings or housing for the brakes.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. The combination with a clutch, of an actuating rod for same, a spring lock adapted to engage said rod for locking it against movement when disengaged from its actuating means, and rod actuating means having a sliding and rocking movement and adapted by its sliding movement to engage the lock and remove it from engagement with the rod, and by its rocking movement shift the actuating rod.

2. The combination with a clutch, of an actuating rod for the same, a spring lock for locking said rod against movement, and a sliding and rocking shaft having a finger adapted when moved by sliding its shaft, to engage said lock and disconnect it from the rod, and when moved by rocking its shaft, to actuate the rod for shifting the clutch.

3. The combination with a clutch, a sliding rod for shifting the latter and a spring locking device independent of the sliding rod for holding the latter against movement when disengaged from its actuating means, of a sliding and rocking shaft having means adapted when the shaft is slid longitudinally to disengage the lock from the rod, and when rocked to engage the rod and actuate the latter.

4. The combination with a clutch and a sliding rod for actuating same, the said rod being slotted near its free end, of a spring actuated locking device adapted to normally rest in said slot and lock the rod against movement, and a sliding and rocking device adapted when slid or moved laterally to engage said locking device and remove it from the slot in the rod, and when rocked to move the rod longitudinally.

In testimony whereof, I have signed this specification in the presence of two subscribing witnesses.

DENNIS P. COLLINS.

Witnesses:
JAMES A. MURPHY,
W. T. MARTERSTEEK.

---

Copies of this patent may be obtained for five cents each, by addressing the "Commissioner of Patents, Washington, D. C."